United States Patent
Kindermann

(10) Patent No.: US 6,536,458 B1
(45) Date of Patent: Mar. 25, 2003

(54) DEVICE FOR HEATING A TAP

(76) Inventor: Peter Kindermann, Schneppenhäuser Strasse 49, D-64331 Weiterstadt (DE)

( * ) Notice: Subject to any disclaimer, the term of this patent is extended or adjusted under 35 U.S.C. 154(b) by 0 days.

(21) Appl. No.: 09/868,611

(22) PCT Filed: Dec. 22, 1999

(86) PCT No.: PCT/DE99/04091

§ 371 (c)(1),
(2), (4) Date: Aug. 15, 2001

(87) PCT Pub. No.: WO00/39409

PCT Pub. Date: Jul. 6, 2000

(30) Foreign Application Priority Data

Dec. 24, 1998 (DE) ..................... 298 22 634 U
Jun. 18, 1999 (DE) ..................... 299 10 715 U

(51) Int. Cl.⁷ ............................................. F16K 49/00
(52) U.S. Cl. ..................... 137/59; 137/341; 138/33; 219/201; 237/80
(58) Field of Search .................... 137/59, 341, 375; 138/33; 219/201; 237/80

(56) References Cited

U.S. PATENT DOCUMENTS

| 1,611,606 | A | * | 12/1926 | Pope ............................ 138/33 |
| 1,748,510 | A | * | 2/1930 | Forman ....................... 137/341 |
| 1,988,289 | A | * | 1/1935 | Witteman .................... 137/341 |
| 3,120,600 | A | * | 2/1964 | True ............................ 137/341 |
| 3,351,738 | A | * | 11/1967 | Kahn ........................... 137/341 |
| 3,354,292 | A | * | 11/1967 | Kahn ........................... 137/341 |
| 3,398,262 | A | * | 8/1968 | Kahn ........................... 137/341 |
| 3,733,459 | A | * | 5/1973 | Lengstorf .................... 137/341 |
| 3,913,602 | A | * | 10/1975 | Yoon ........................... 137/341 |
| 4,094,446 | A | | 6/1978 | Brutsman .................... 219/431 |
| 4,110,603 | A | * | 8/1978 | Peterson et al. ............ 137/341 |
| 5,614,119 | A | * | 3/1997 | Ollis ............................ 138/33 |
| 5,743,289 | A | * | 4/1998 | Griffin et al. ................ 137/341 |
| 5,837,970 | A | | 11/1998 | Jilek ............................ 219/201 |

FOREIGN PATENT DOCUMENTS

| DE | 446375 | 6/1927 |
| DE | 27 26905 | 12/1978 |
| DE | 35 09 305 A1 | 9/1986 |
| DE | 35 14 640 A1 | 10/1986 |
| DE | 42 30 795 A1 | 3/1994 |
| DE | 43 09 543 C | 5/1994 |
| DE | 296 05 392 U | 5/1996 |
| FR | 2 578 878 A | 9/1986 |
| FR | 2 632 704 A | 12/1989 |
| GB | 631563 | 11/1949 |

* cited by examiner

*Primary Examiner*—George L. Walton
(74) *Attorney, Agent, or Firm*—Arent Fox Kintner Plotkin & Kahn

(57) ABSTRACT

The aim of the invention is to prevent outer taps from being damaged by the effects of frost. To this end, the invention provides a heating device for heating a tap (1) with an electrothermal converter (2) means. Said heating device is mounted in or on the tap. The invention also relates to a valve device in which a heating means can be plugged into a corresponding socket (11), thereby effectively preventing the tap from freezing.

13 Claims, 4 Drawing Sheets

DEVICE FOR HEATING A TAP

The present invention relates to a device for heating a tap, i.e. a valve device equipped with such a heating device.

Many residential buildings and industrial plants have taps or plug valves in their outer walls. Thus, the taps are in danger of frost, i.e. if outside temperatures fall below zero and the tap freezes up, it may suffer damages after thawing out again.

In order to prevent these effects of frost, outer taps in outer walls are normally equipped with separate check valves inside the building, e.g. in the cellar wall. In this way, the supply of the outer tap is prevented and the outer tap may be emptied in order to protect it against frost.

As the outer tap usually is not emptied automatically, it is subject to the monitoring of a person. Therefore, there is always the possibility of forgetting to empty the tap due to the monitor's inattentiveness or the inaccessibility of the respective cellar room with the check valve. And this is also the reason why many outer taps are damaged once and again by the effects of frost and have to be replaced. This direct damage goes hand in hand with water damage, which occurs just after thawing.

In the present invention, this problem is solved by a heating device according to claim 1. A heating device for heating a tap is equipped with an electrochemical converter, which may be installed in or on the tap.

The inventive heating device has the advantage that, when installed on or in a tap, it prevents a freezing up whenever outside temperatures fall beyond the freezing point. In this way, the tap becomes maintenance-free and does not need to be emptied any longer. Thus, house-owners, property managements and janitors may not neglect to shut off and empty the outer taps and therefore may not be exposed to corresponding claims for compensation.

Figure 1:
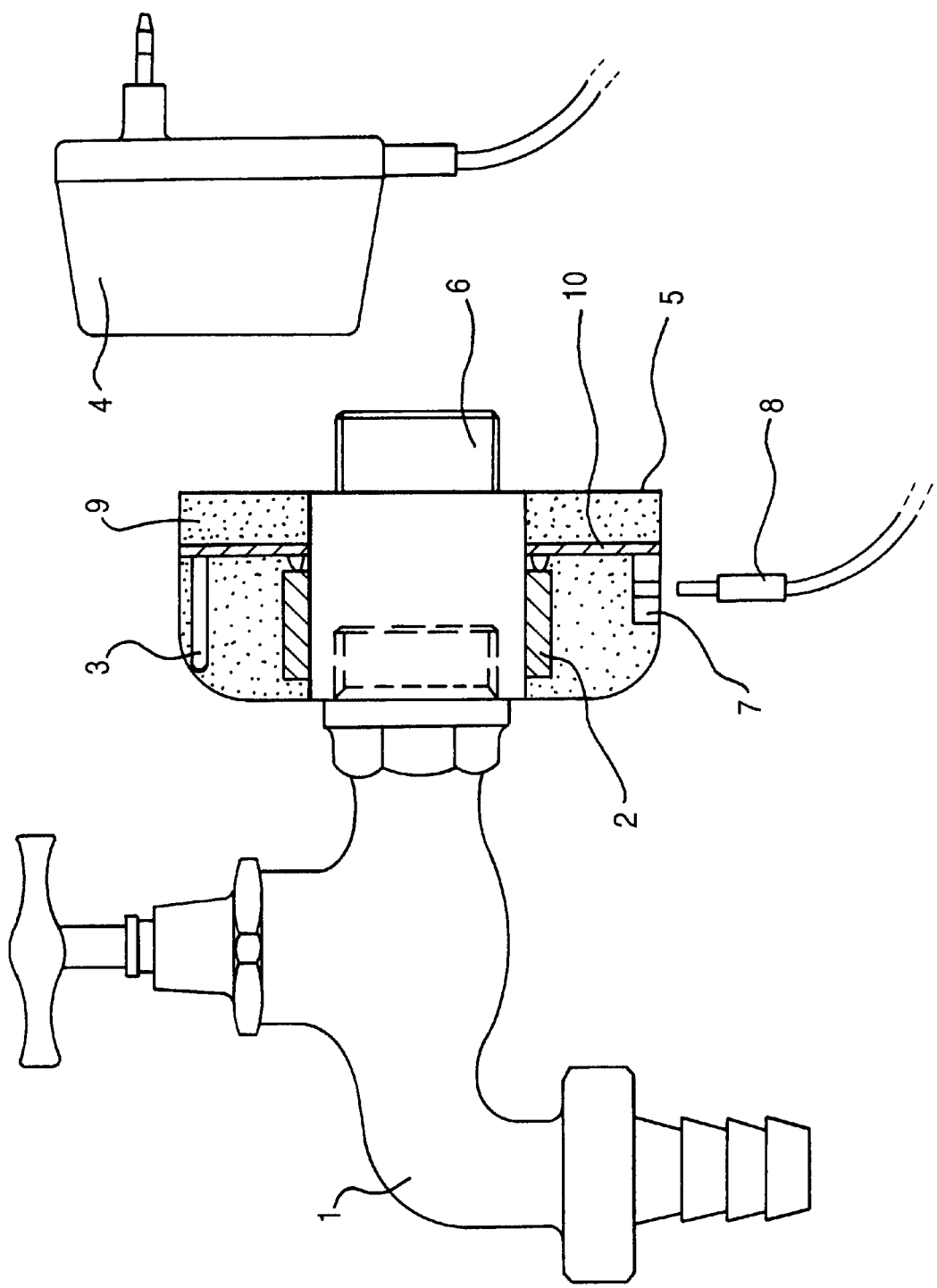
Figure 2:
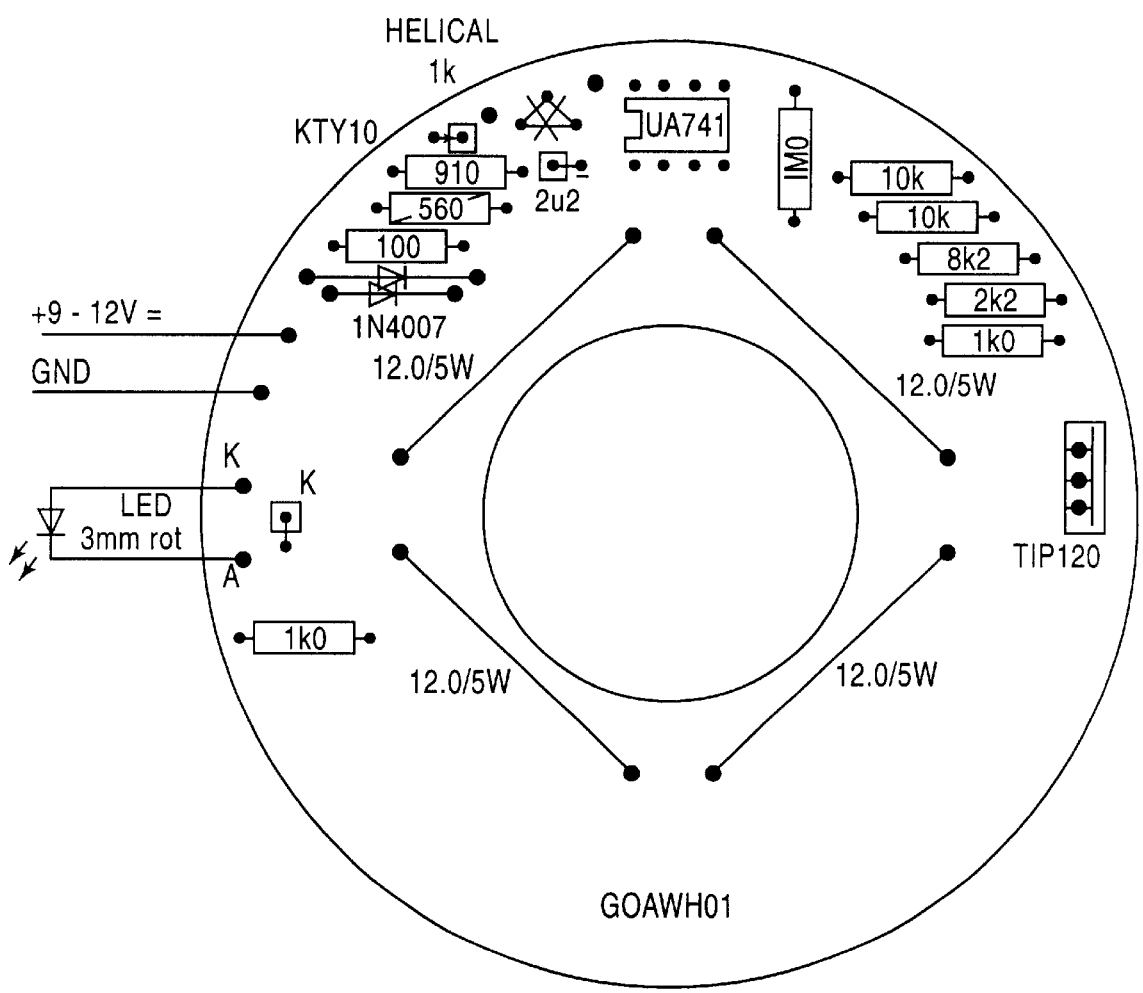
Figure 3:
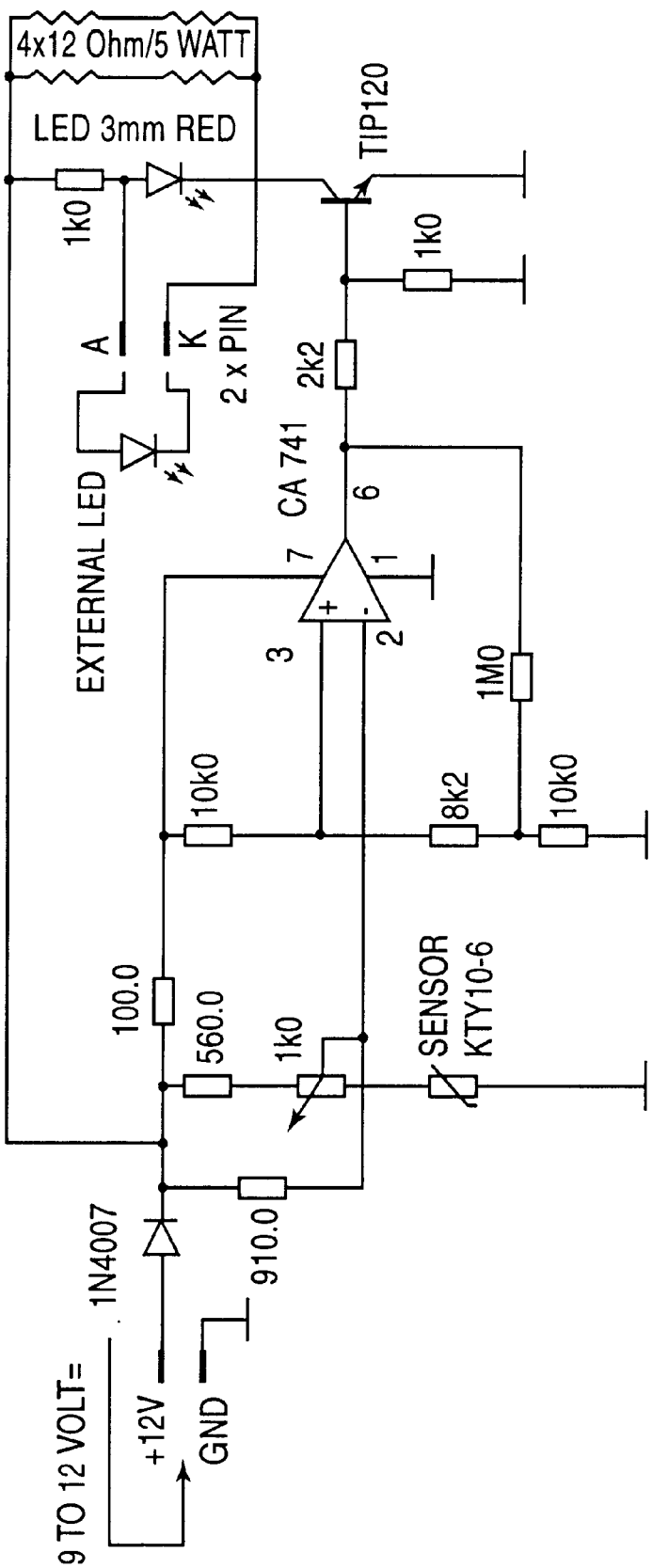

The present invention becomes clear throughout the following description with reference to the enclosed drawings. The drawings show:

FIG. 1 a cross-section view of a heating device, which is installed on or in a tap according to the present invention;

FIG. 2 a top view of the lead frame revealed in FIG. 1, onto which the electric components of the heating device may be installed; and FIG. 3 the circuit diagram of a control circuit for the heating device.

Figure 4:
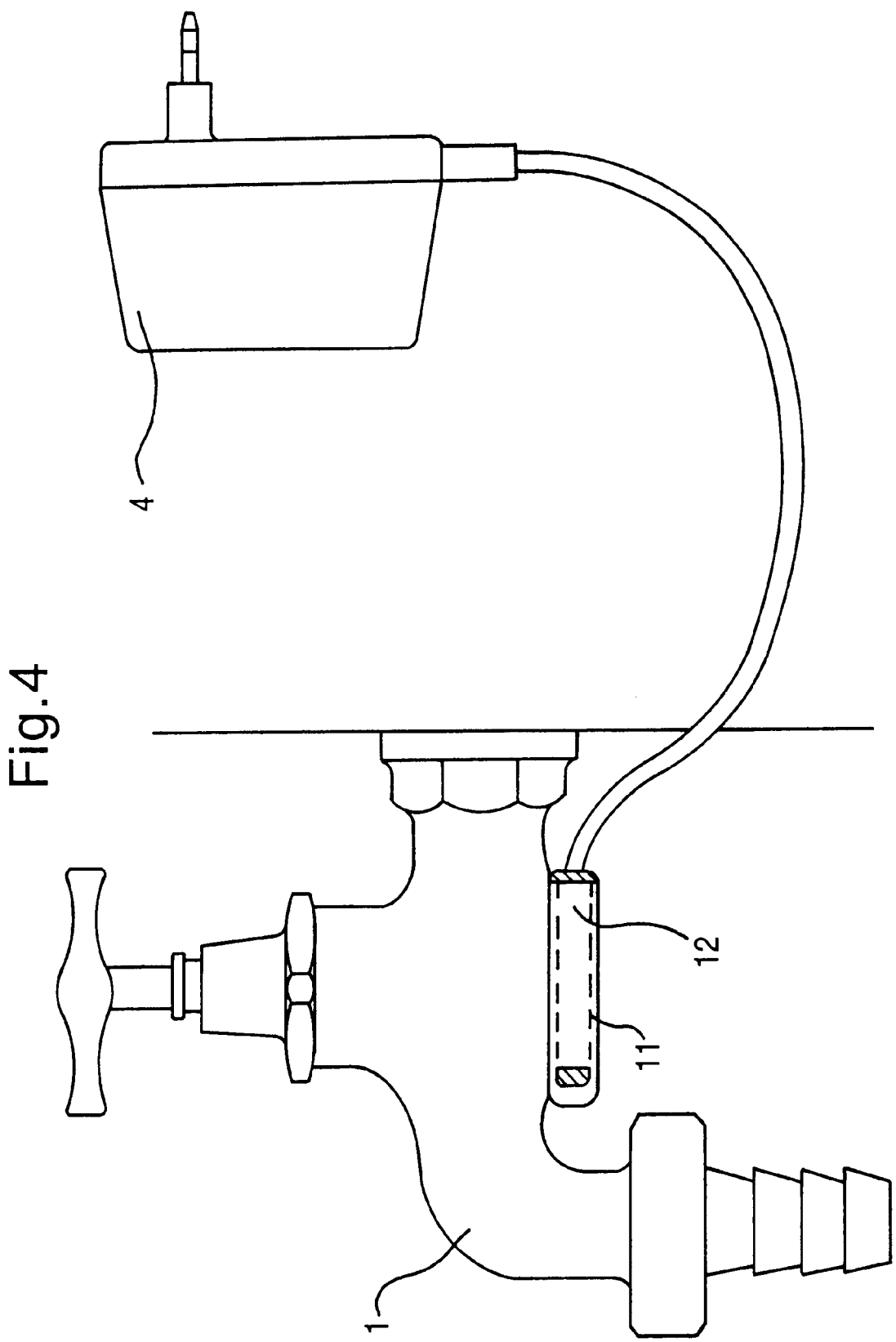

FIG. 4 a further embodiment of the present invention.

As detailed below, a preferred embodiment of the present invention is illustrated in FIG. 1. A pipe section 6 supports the heating devices 2 to 10. The pipe section 6 presents an internal thread on one side and an external thread on the other side and thus is a conventional pipe extension. It is preferably made of brass and usually has a diameter of ½, ¼ or 1 inch. In FIG. 1, the extension pipe 6 is screwed as far as possible onto a thread of the tap, i.e. plug valve 1, on its left side. Due to this screw connection between the extension pipe 6 and the tap 1, a rosette shaped conclusion diaphragm 5 may be fixed thereto with its opening facing away from tap 1. Normally, it also connects to a house wall, which is not represented in the figures. The extension pipe 6 has the same length as the depth of the rosette shaped conclusion diaphragm 5. Therefore, only the external thread of the pipe extension 6 juts out of the conclusion diaphragm's 5 side facing away from tap 1. The length of the pipe extension 6 and hence the depth of the rosette shaped conclusion diaphragm 5 in the present embodiment is 40 mm. Of course, this may alter according to each heating device and under different circumstances.

Between the outer diameter of the pipe extension 6 and the inner diameter of the conclusion diaphragm 5, a cyclic lead frame 10 is adjusted like represented in FIG. 1. It supports the electrochemical converter 2, which is crucial for the heating. In the present embodiment, this converter consists of several heat resistors, which are brought into direct contact with the pipe extension 6 by bending them or similar. Due to this direct contact, the heat energy of the heat resistor is conducted away efficiently from the pipe extension 6, which, on its behalf, leads the produced heat to tap 1 and in this way prevents a freezing up of the liquids contained therein.

Furthermore, the board provides a temperature sensor 3, which is arranged next to the conclusion diaphragm 5 and distant to the heat resistors 2. Therefore, the temperature sensor 3 does not detect the temperature of the heat elements 2, but of the whole heating device. All in all, the position of the temperature sensor 3 is not decisive for the functioning of the heating device. A hysteresis formed according to the temperature adjustment circuit, which uses the signal of the temperature sensor 3 for the regulation of the heat resistor 2, takes into account the position of the temperature sensor 3.

Moreover, further electrical components, which are essential for the temperature adjustment, are situated within a lead frame 10 including therein a ring board 10 on the ring board 10. Some of them are described more in detail in FIG. 3.

Eventually, the present embodiment also presents a socket 7, which is installed to the edge of the ring board. This socket supplies the board 10 via the conclusion diaphragm 5 with electricity.

According to FIG. 1, a mains adaptor or transformer 4 transforms the conventional alternate current voltage of 230 or, in some cases 110 volts, into a direct voltage of 9 to 12 volts and thus provides the power supply of the board 10. This transformer 4, which may be plugged inside or outside of the building, supplies the heating via a cable and a plug 8 for the socket 7 with the necessary current.

In order to protect the lead frame 10 from outer influences, it is moulded together with the components situated on it into the rosette shaped conclusion diaphragm 5 with synthetic resin. The result is a very compact and resistant heating device.

FIG. 2 shows a top view of the ring board 10. The inner diameter approximately corresponds to the outer diameter of the extension pipe 6. The outer diameter approximately corresponds to the inner diameter of the conclusion diaphragm 5.

The electric components for the temperature adjustment circuit (cf. FIG. 3) are arranged next to the outer circuit. FIG. 2 reveals four heat resistor elements with 12.0 Ohms and 5 watts and their corresponding plug bores via lines.

In the left upper section of the board in FIG. 2, the plugs for a 1-kilo ohm helical trimmer and a 560-ohm series resistor are shown. They are crossed out, because in their serial production a tight resistor, here 910 Ohm, replaces them.

The temperature adjustment circuit corresponding to the equipment of the lead frame 10 of FIG. 2 is shown in FIG. 3. A temperature sensor measures the outside temperature, or the temperature of the heating device respectively, in this case a silicon sensor KTY10-6, and compares the output signal with an adjustable voltage. As already mentioned, the voltage may be adjusted tightly with a tight resistor and individually with a helical trimmer. Usually, the value is adjusted just above zero degrees. If temperature falls below this predetermined lowest value, the four heat resistors 2 are switched on. They heat up and due to their direct contact with the pipe extension 6 or a pipeline provide heat thereto. When the upper predetermined value is exceeded due to this heating up, the heat resistors are switched off and cool down until the temperature again falls below the predetermined lowest value. In the present embodiment the hysteresis between the lowest and upper temperature value is about 4° C. The described heating and cooling down process repeats until the outside temperature rises so far that it does not fall below the predetermined lowest value any longer.

We have chosen ceramic resistors as heat resistors, which are provided with electricity via a transistor. The electrical energy produced within the resistors causes the heating up of the resistors and hence the heating up of the whole system. The heat resistors, however, may be coils of resistance wire or several heating bands or combinations thereof.

Possible modifications of a device for heating a tap are detailed below.

The electrochemical converter 2 may consist of one or several components mentioned before or described below. Therefore, not only heat-resistance elements may be provided, but also inductive heat elements. These inductive heat elements are applied inside or to the tap 1 or corresponding pipe extension in such a way that it is heated up by induced gyre currents.

Besides, it is also possible to substitute the heat resistor elements with assemblies of heat-resistance wires. A heating coil wrapped around the pipe extension 6 may achieve this. Heat resistors, however, may also be arranged around the perimeter of the extension pipe, for example meander shaped etc. Also, a heat band may be wrapped around the pipe extension 6. Likewise, other electrochemical converters, e.g. Peltier elements, may be applied as heating elements.

In the present embodiment, the heating device forms a connection between tap 1 and a main. The heating device, however, may also form two collapsible ring halves, which may be installed directly to the tap. Furthermore, the heating device does not need to be arranged concentrically around a main. It is rather possible to heat the tap up only locally, i.e. by means of the heating device, e.g. below or at the screw down valve. Since the tap usually consists of well heat conductive material, the heat produced here spreads out over the whole tap, thus preventing its freezing up.

In this context, FIG. 4 shows another embodiment of the present invention. In this embodiment, the heating device is not installed as a rosette 5 between wall and tap 1, but within a socket 11 in or on the tap 1 below the screw down valve. The socket 11 is either fixed by means of a common fastening process on the tap, or directly moulded thereto as one body. A cartridge 12, which may be squeezed into the socket 11, comprises the electrochemical converter and preferably also a temperature sensor or thermostat. The opening of the socket 11 faces the house wall, thus, the heat cartridge 12 cannot be withdrawn from the socket 11 after the tap 1 has been installed. A heat conducting paste improves the heat passage between heat cartridge 12 and socket 11. The heat cartridge 12 may be moulded waterproof into the socket 11.

Whenever security aspects are uncritical, it is also possible to plug the heating device perpendicularly upwards into a socket of the tap and withdraw it downwards. Alternatively, the heating device may comprise an installation device so that it can be installed to conventional taps. In this way, it is possible to use, for example clamps, screw fixtures or magnetic mounts as installation devices. An installation device like this has the advantage that basically every tap may later be provided economically with a heating device.

Basically, the temperature adjustment as well as the temperature regulation may also take place via an outer temperature sensor. It is also possible to place the temperature adjustment, or temperature steering device respectively, inside the building and conduct the corresponding command signals, or regulation signals respectively, outside to the heating device. Moreover, instead of choosing a hysteresis of 4° C. in the heating-up/cooling-down process, it may also be chosen a wider or smaller hysteresis. In this way, the tap may be heated up from, for example, 0 to 12 and up to 18° C. Thus, it is also possible to supply a heating device permanently with currents so that a continuous heating is guaranteed whenever it is desired. Like that, it is possible to establish a natural temperature balance between heat supplied and drawn off to the environment.

In order to relieve the installation procedure for the end-user, the heating device may also be installed tightly to a tap. Hence, the end-user only needs to change the heatable tap with the conventional tap and install it to the main. Thus, damage due to an improperly installation may be avoided.

Finally, it is also possible to integrate a mains adaptor 4 directly to the heating device with a corresponding isolation.

The valve device is preferably a ball valve.

What is claimed is:

1. A heating device powered by an electrical source for heating a tap comprising:
   an electrothermal converter connected to the electrical source; and
   an attachment device, for attaching the heating device in or on an inlet of the tap, wherein the attachment device has a circuit board that surrounds a portion of the inlet of the tap and is supported by the attachment device, wherein
   the electrothermal converter is connected to the circuit board and affixed to the attachment device so that a heat generated by the electrothermal converter may be transferred via the attachment device to the tap.

2. The heating device according to claim 1, further comprising:
   a temperature sensor connected to the circuit board for controlling the electrothermal converter based on an environmental temperature.

3. The heating device according to claim 2, wherein at least one of the temperature sensor, a temperature adjustment circuit, a temperature control circuit, the electrothermal converter, and a socket for providing electric power into the electrothermal converter is disposed in a rosette shaped conclusion diaphragm.

4. The heating device according to claim 3, wherein at least one of the temperature sensor, the electrothermal converter, the temperature adjustment device, and the temperature control circuit is installed in a ring-forming lead frame.

5. The heating device according to claim 4, wherein the rosette shaped conclusion diaphragm forms a fitting sleeve or protective cover on the tap.

6. The heating device according to claim 2, wherein the rosette shaped conclusion diaphragm forms a protective cover on the tap.

7. The heating device according to claim 2, wherein the electrothermal converter generates heat via an inductive or ohmic operation.

8. The heating device according to claim 2, further comprising:

a thermostat connected to the temperature sensor; and
a heating adjustment circuit, wherein the heating adjustment circuit adjusts the operation of the electrothermal converter to heat the tap to a desired temperature set by the thermostat.

9. The heating device according to claim 1, the attachment device further comprising:

a main enclosure, wherein at least one of a plurality of electrical converters is concentrically located around the main enclosure.

10. The heating device according to claim 1 further comprising:

at least one of a temperature adjustment device and a temperature controlling device to control a temperature of the tap to not fall below a predetermined threshold temperature.

11. The heating device according to claim 1, further comprising a valve.

12. The heating device according to claim 11, wherein the attachment device is attachable to an exterior surface of the valve.

13. The heating device according to claim 12, wherein a socket is provided in the attachment device wherein the electrothermal converter may be inserted therein.

* * * * *